(12) United States Patent
Sigl et al.

(10) Patent No.: US 9,017,210 B2
(45) Date of Patent: Apr. 28, 2015

(54) DRIVE DEVICE FOR THE ROAD WHEELS OF A VEHICLE

(71) Applicants: Horst Sigl, Passau (DE); Paul Lenz, Waldkirchen (DE); Peter Haselberger, Mauth (DE); Rudolf Neumüller, Buechlberg (DE); Klaus Alesch, Untergriesbach (DE); Alexander Enderl, Vilshofen (DE)

(72) Inventors: Horst Sigl, Passau (DE); Paul Lenz, Waldkirchen (DE); Peter Haselberger, Mauth (DE); Rudolf Neumüller, Buechlberg (DE); Klaus Alesch, Untergriesbach (DE); Alexander Enderl, Vilshofen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/161,905

(22) Filed: Jan. 23, 2014

(65) Prior Publication Data

US 2014/0206489 A1 Jul. 24, 2014

(30) Foreign Application Priority Data

Jan. 24, 2013 (DE) .......................... 10 2013 201 087

(51) Int. Cl.
*F16H 48/06* (2006.01)
*F16H 48/38* (2012.01)
*F16H 57/031* (2012.01)
*B60K 17/04* (2006.01)

(52) U.S. Cl.
CPC .............. *F16H 48/38* (2013.01); *F16H 57/031* (2013.01); *B60K 17/046* (2013.01)
USPC .......................................................... 475/220

(58) Field of Classification Search
USPC ........ 475/220, 230, 246, 248, 253; 74/606 R, 74/607
See application file for complete search history.

(56) References Cited

U.S. PATENT DOCUMENTS

| | | | |
|---|---|---|---|
| 1,506,037 A | 8/1924 | Alden et al. | |
| 1,613,566 A | 1/1927 | Melanowski | |
| 2,061,009 A | 11/1936 | Rothrock | |
| 2,546,969 A | 4/1951 | Buckendale | |
| 2,659,246 A | 11/1953 | Norelius | |
| 4,004,471 A * | 1/1977 | Keske | 475/251 |
| 4,733,578 A | 3/1988 | Glaze et al. | |
| 6,554,733 B2 * | 4/2003 | Niebauer | 475/230 |
| 6,695,739 B2 * | 2/2004 | Fett | 475/230 |
| 6,814,683 B2 * | 11/2004 | Krzesicki et al. | 475/230 |
| 7,722,495 B1 * | 5/2010 | Stanley | 475/220 |
| 7,775,929 B2 | 8/2010 | Waksmundzki | |
| 8,109,000 B2 * | 2/2012 | Zalanca et al. | 29/897.2 |
| 2010/0151983 A1 | 6/2010 | Ziech et al. | |
| 2011/0075960 A1 * | 3/2011 | White et al. | 384/606 |

* cited by examiner

*Primary Examiner* — Saul Rodriguez
*Assistant Examiner* — David J Hlavka
(74) *Attorney, Agent, or Firm* — Cozen O'Connor

(57) ABSTRACT

A drive device for road wheels of a vehicle includes: a stationary housing; a rotatably drivable differential housing with an axle differential gear unit, the differential housing being rotatably mounted in the stationary housing by differential bearings; at least one driveshaft rotatably drivable by the rotatably drivable differential housing; at least one driving gear wheel associated with and arranged on the at least one driveshaft, so as to be fixed with respect to rotation relative to the at least one driveshaft; and at least one driven gear wheel, the at least one driving gear wheel meshingly engaging, by oppositely directed helical teeth, with the at least one driven gear wheel to drive the road wheels of the vehicle and generate axial forces directed toward the center of the axle differential gear unit, and having at least one thrust bearing arrangement configured to support the axial forces.

6 Claims, 1 Drawing Sheet

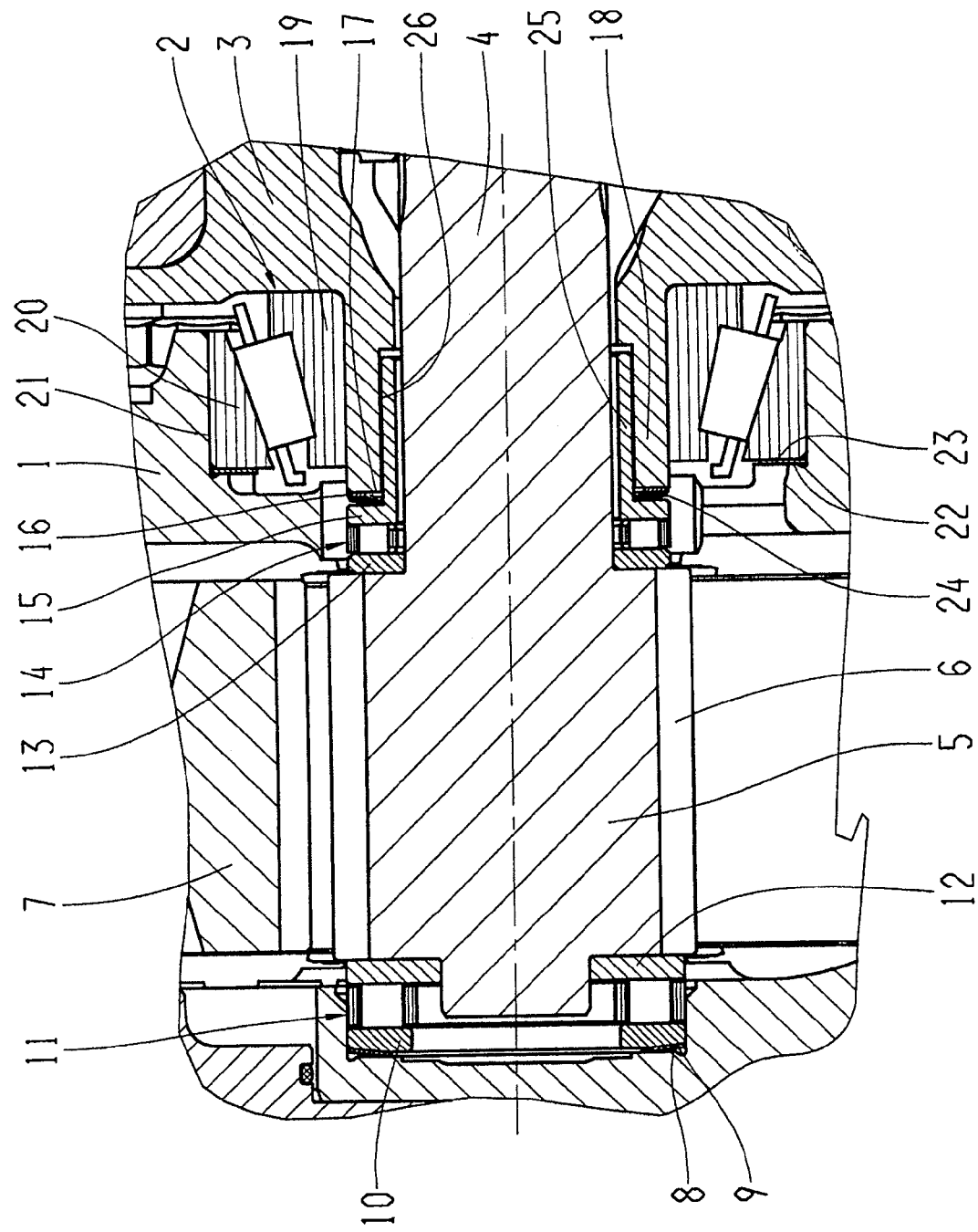

DRIVE DEVICE FOR THE ROAD WHEELS OF A VEHICLE

BACKGROUND OF THE INVENTION

1. Field of the Invention

The invention is directed to a drive device for the road wheels of a vehicle with a stationary housing in which a rotatably drivable differential housing with an axle differential gear unit is rotatably mounted by differential bearings, typically two driveshafts being rotatably drivable by the differential housing, a driving gear wheel being arranged on the two driveshafts in each instance so as to be fixed with respect to rotation relative to the latter. The driving gear wheels meshingly engage by oppositely directed helical teeth with driven gear wheels for driving road wheels of the vehicle and generate axial forces directed toward the center of the axle differential gear unit, with thrust bearing arrangements for supporting these axial forces, these thrust bearing arrangements being in turn supported at a structural component part of the drive device.

2. Description of the Related Art

In a drive device of the type mentioned above, it is known to support the axial forces of the driving gear wheels directed toward the center of the axle differential at parts of the housing that project radially between the driving wheels and the differential housing until closely adjacent to the driveshafts and have an axial guide and a radial supporting surface for the thrust bearing arrangements.

If the helix angle of the helical toothing is to be large so that higher outputs can be transmitted, there will also be an increase in the axial forces generated by the driving gear wheels and directed to the center of the axle differential and which must be supported via the thrust bearing arrangements at the parts of the housing. This requires a larger bearing arrangement and a more stable design of the parts of the housing and, therefore, a larger installation space. However, enlargement in the axial direction is impossible because the installation space is limited by the rims of the road wheels, by the tire clearance for the latter and by the differential bearings.

SUMMARY OF THE INVENTION

Therefore, it is an object of the invention to provide a drive device of the type mentioned above that is constructed in a simple manner and that allows the increased axial forces generated by the driving wheels to be supported without an increased installation space requirement.

This object is met, according to a first aspect of the invention, in that the thrust bearing arrangements are supported axially with respect to the driveshafts at radial supporting surfaces of the differential housing or of a structural component part fixedly connected to the differential housing.

In this way, the axial space between the driving gear wheel and differential housing is available in its entirety for the bearing arrangement so that the latter can be larger and, therefore, configured in a more suitable manner for higher axial forces without an increased installation space requirement.

Further, a larger helix angle of the helical toothing of the driving gear wheels benefits noise behavior and reduces gear tooth friction loss.

By virtue of the fact that the parts of the housing now need no longer extend to a point closely adjacent to the driveshaft for receiving and supporting the bearing arrangements, the driveshafts can be formed integrally with driving gear wheels with which they are associated and the driveshafts formed integrally with the driving gear wheels can be mounted from the differential side, so as to facilitate assembly.

For exact axial positioning of the driving gear wheel, a first spacer disk of determined thickness can be arranged between each thrust bearing arrangement and the supporting surface of the differential housing associated with it. In order to prevent a rotation, the first spacer disk is preferably connected to the differential housing so as to be fixed with respect to rotation relative to it. To this end, the first spacer disk can have radially inwardly directed projections which extend into corresponding recesses of the differential housing.

In order also to achieve an axial positioning of the differential bearing relative to the housing corresponding to the axial positioning by the first spacer disk, each differential bearing can contact a radial second supporting surface of the housing axially via a second spacer disk of determined thickness, and the first spacer disk and the second spacer disk have the same thickness. Spacer disks of the required thickness are applied depending on the actual proportions.

In order to transmit high axial forces, in one aspect, the thrust bearing arrangement can have an annular housing disk that directly or indirectly axially contacts the driving gear wheel and an annular shaft disk that directly or indirectly axially contacts the supporting surface of the differential housing. The annular housing disk and annular shaft disk surround the driveshaft and an axial rolling bearing is arranged between them.

To pre-load the bearings, the driving gear wheel is loaded axially toward the center of the axle differential gear unit in a simple manner by a first spring element which is supported at the housing.

By arranging an axially pre-loaded second spring element between the shaft disk and first supporting surface or first spacer disk, this second spring element ensures that the housing disk and the shaft disk are always pre-loaded against the rolling elements of the axial rolling bearing. This prevents an impact when the play between these parts is overcome when the driveshaft changes rotational direction.

The shaft disk can have a coaxial sleeve projection of the same inner diameter, this inner diameter being greater that the outer diameter of the driveshaft, and the sleeve projection is axially displaceably guided by its radially circumferential cylindrical lateral surface in a corresponding coaxial guide recess of the differential housing. This reliably prevents an annoying noise-producing grinding of the shaft disk and sleeve projection on the rotating driveshaft.

In a simple construction, the first spring element and/or the second spring element can be plate springs.

Other objects and features of the present invention will become apparent from the following detailed description considered in conjunction with the accompanying drawing. It is to be understood, however, that the drawing is designed solely for purposes of illustration and not as a definition of the limits of the invention, for which reference should be made to the appended claims. It should be further understood that the drawing is not necessarily drawn to scale and that, unless otherwise indicated, it is merely intended to conceptually illustrate the structures and procedures described herein.

BRIEF DESCRIPTION OF THE DRAWING

An exemplary embodiment of the invention is shown in the drawing and is described more fully in the following. In the drawing:

The FIGURE shows a section of a drive device for the road wheels of a vehicle.

DETAILED DESCRIPTION OF THE PRESENTLY PREFERRED EMBODIMENTS

As seen in the FIGURE, a rotatably drivable differential housing 3 of an axle differential gear unit, not shown, is rotatably mounted in a housing 1 by two differential bearings 2, one of which is shown.

Two driveshafts 4 are rotatably drivable in a diametrically opposed manner by the axle differential gear unit. The section illustrated in the FIGURE shows the area of one of these driveshafts 4.

At its end remote of the axle differential gear unit, the driveshaft 4 is formed integral with a driving gear wheel 5 having a helical toothing 6. The driving gear wheel 5 is in meshing engagement with a driven wheel 7 such that a road wheel (not shown) of a vehicle can be driven in rotation.

The housing 1 encloses the end of the driveshaft 4 having the driving gear wheel 5. Supported on the base of a coaxial recess 8 of the housing 1 is a plate spring 9, which pre-loads the driving gear wheel 5 and the driveshaft 4 in direction of the differential housing 3 via a running disk 10 and a first axial cylindrical rolling bearing 11 and a first shaft disk 12.

The driving gear wheel 5 is supported on the side facing the differential housing 3 at an annular radial first supporting surface 17 of a tubular elongation 18 of the differential housing 3 by—in axially successive arrangement—a housing disk 13, a rolling bearing formed as a second axial cylindrical rolling bearing 14, a second shaft disk 15 and a first spacer disk 16. A second plate spring 24 is arranged so as to be axially pre-loaded between the first spacer disk 16 and the second shaft disk 15.

The shaft disk 15 has a coaxial sleeve projection 25 of the same inner diameter, this inner diameter being greater that the outer diameter of the driveshaft 4. The sleeve projection 25 is axially displaceably guided by its radially circumferential cylindrical lateral surface in a corresponding coaxial guide recess 26 of the differential housing 3.

The inner ring 19 of the one differential bearing 2 formed as a tapered roller bearing is arranged on the radially circumferential lateral surface of the tubular elongation 18. The inner ring 19 contacts the differential housing 3 axially.

The outer ring 20 of the differential bearing 2 is inserted into a blind hole 21 in the housing 1 and is supported by its side remote of the differential housing 3 axially via a second spacer disk 23 at the base 22 thereof, this base 22 forming a second supporting surface.

The two spacer disks 16 and 23 have the same thickness.

When the driveshaft 4 is driven in rotation, axial forces directed to the center of the axle differential gear unit are generated on the driveshaft 4 by the driving gear wheel 5 owing to its helical toothing 6. These axial forces are supported at the annular radial first supporting surface 17 of the tubular elongation 18 of the differential housing 3 by the thrust bearing arrangement comprising housing disk 13, second axial cylindrical rolling bearing 14 and second shaft disk 15 and by the first spacer disk 16.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A drive device for road wheels of a vehicle, the drive device comprising:
   a stationary housing (1);
   a rotatably drivable differential housing (3), the rotatably drivable differential housing (3) being rotatably mounted in the stationary housing (1) by differential bearings (2);
   at least one driveshaft (4) rotatably drivable by the rotatably drivable differential housing (3);
   at least one driving gear wheel (5) associated with and arranged on the at least one driveshaft (4), so as to be fixed with respect to rotation relative to the at least one driveshaft (4);
   at least one driven gear wheel (7), the at least one driving gear wheel (5) meshingly engaging, by oppositely directed helical teeth, with the at least one driven gear wheel (7) to drive the road wheels of the vehicle and generate axial forces, and having at least one thrust bearing arrangement configured to support the axial forces; and
   a first spacer disk (16) arranged between the at least one thrust bearing arrangement and at least one radial supporting surface (17) of the rotatably drivable differential housing (3),
   wherein the at least one thrust bearing arrangement is supported axially with respect to the at least one driveshaft (4) at, directly or indirectly, the at least one radial supporting surface (17) of the rotatably drivable differential housing (3),
   wherein the at least one driving gear wheel (5) is loaded axially by a first plate spring element (9) supported at the stationary housing (1), and
   wherein an axially pre-loaded second plate spring element (24) is arranged between the shaft disk (15) and the at least one radial supporting surface (17) or the first spacer disk (16).

2. The drive device according to claim 1, wherein the at least one driveshaft (4) is formed integrally with an associated at least one driving gear wheel (5).

3. The drive device according to claim 1, wherein the first spacer disk (16) is connected to the rotatably drivable differential housing (3) so as to be fixed with respect to rotation relative to it.

4. The drive device according to claim 1, wherein each differential bearing (2) contacts a radial second supporting surface (22) of the stationary housing (1) axially via a second spacer disk (23) of determined thickness, wherein the first spacer disk (16) and the second spacer disk (23) have the same thickness.

5. The drive device according to claim 1, wherein the at least one thrust bearing arrangement has an annular housing disk (13) directly or indirectly axially contacting the at least one driving gear wheel (5) and an annular shaft disk (15) directly or indirectly axially contacting the at least one radial supporting surface (17) of the rotatably drivable differential housing (3), the annular housing disk (13) and annular shaft disk (15) surrounding the at least one driveshaft (4), and an axial rolling bearing (14) being arranged between them.

6. The drive device according to claim 1, wherein the shaft disk (15) has a coaxial sleeve projection (25) of the same inner diameter, wherein this inner diameter is greater that the outer diameter of the at least one driveshaft (4), and the sleeve projection (25) is axially displaceably guided by its radially circumferential cylindrical lateral surface in a corresponding coaxial guide recess (26) of the rotatably drivable differential housing (3).

* * * * *